United States Patent
Vachon et al.

(10) Patent No.: US 12,540,444 B2
(45) Date of Patent: Feb. 3, 2026

(54) SURFACE COVERING PANEL ASSEMBLY AND METHODS OF MANUFACTURING AND OF INSTALLING THE SAME

(71) Applicant: 4427017 CANADA INC., Laval (CA)

(72) Inventors: Frederic Vachon, Ste-Dorothée (CA); Richard Di Pietro, Laval (CA)

(73) Assignee: NEXXFIELD INC., Laval (CA)

( * ) Notice: Subject to any disclaimer, the term of this patent is extended or adjusted under 35 U.S.C. 154(b) by 329 days.

(21) Appl. No.: 18/138,525

(22) Filed: Apr. 24, 2023

(65) Prior Publication Data

US 2024/0125056 A1   Apr. 18, 2024

Related U.S. Application Data

(63) Continuation-in-part of application No. 16/667,265, filed on Oct. 29, 2019, now abandoned, which is a
(Continued)

(51) Int. Cl.
*E01C 13/08* (2006.01)
*B32B 3/06* (2006.01)
(Continued)

(52) U.S. Cl.
CPC ............ *E01C 13/083* (2013.01); *B32B 3/06* (2013.01); *B32B 5/18* (2013.01); *B32B 25/045* (2013.01);
(Continued)

(58) Field of Classification Search
CPC ....... E01C 13/083; E01C 13/08; B32B 25/14; B32B 27/40; B32B 7/02; B32B 25/045;
(Continued)

(56) References Cited

U.S. PATENT DOCUMENTS

2018/0237998 A1 *  8/2018  Vachon ................... E01C 3/006
2020/0070038 A1 *  3/2020  Vachon ................... B32B 27/322

FOREIGN PATENT DOCUMENTS

FR             2600348 A1 * 12/1987 ............... B32B 5/18

OTHER PUBLICATIONS

English Machine Translation of FR 2600348.*

* cited by examiner

*Primary Examiner* — Jennifer A Gillett
(74) *Attorney, Agent, or Firm* — Legal Inc.; Charles-Andre Caron; Mathieu Audet

(57) ABSTRACT

A panel assembly is designed to be installed adjacent each other comprising surface covering panels and joining padding layer panels. Surface covering panels comprises padding layer panels made of a first material, a sheet member affixed to the padding layer panel comprising edges extending beyond the padding layer panel; and a first component of a fastening element affixed to the edges. Joining padding layer panels comprise a body made of a second material different to the first material; and a second component of the fastening element affixed to the top surface of the joining padding layer. The components of the fastening element are adapted to interface with each other such as releasably attaching joining padding layer panels to the edges of adjacent surface covering panels, and maintain fastening of the adjacent surface covering panels when undergoing thermal expansion resulting in shear displacement of the components of the fastening element.

15 Claims, 9 Drawing Sheets

Related U.S. Application Data continuation-in-part of application No. 14/336,568, filed on Jul. 21, 2014, now abandoned.

(60) Provisional application No. 61/856,342, filed on Jul. 19, 2013.

(51) Int. Cl.
*B32B 5/18* (2006.01)
*B32B 25/04* (2006.01)
*B32B 25/14* (2006.01)
*B32B 27/40* (2006.01)

(52) U.S. Cl.
CPC .............. *B32B 25/14* (2013.01); *B32B 27/40* (2013.01); *B32B 2307/72* (2013.01)

(58) Field of Classification Search
CPC .......... B32B 2266/025; B32B 2307/72; B32B 2307/7376; B32B 3/06; B32B 5/18; B32B 27/065

See application file for complete search history.

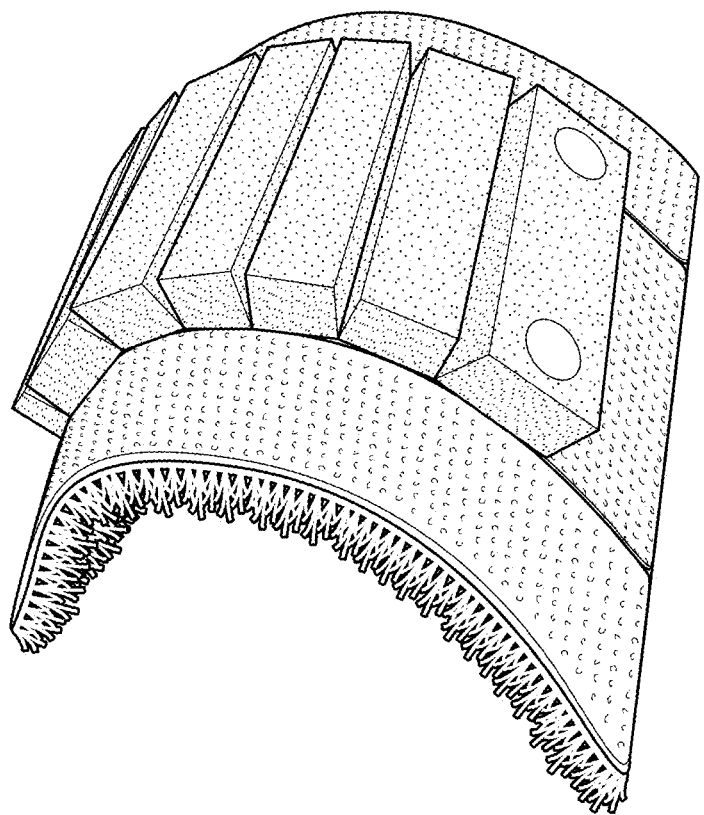
PRIOR ART  FIG. 1

SURFACE COVERING PANEL ASSEMBLY AND METHODS OF MANUFACTURING AND OF INSTALLING THE SAME

CROSS-REFERENCE TO RELATED APPLICATION

This application is a continuation-in-part of U.S. patent application Ser. No. 16/667,265 filed Oct. 29, 2019, entitled SURFACE COVERING PANEL, SURFACE COVERING PANEL ASSEMBLY AND METHOD OF INSTALLING THE SAME, which is a continuation-in-part of U.S. patent application Ser. No. 14/336,568 filed Jul. 21, 2014, entitled SURFACE COVERING PANEL, SURFACE COVERING PANEL ASSEMBLY AND METHOD OF INSTALLING THE SAME, which claims priority from U.S. provisional patent application 61/856,342 filed Jul. 19, 2013, entitled SURFACE COVERING PANEL, SURFACE COVERING PANEL ASSEMBLY AND METHOD OF INSTALLING THE SAME, the specifications of which are hereby incorporated by reference.

BACKGROUND

(A) Field

The subject matter disclosed generally relates to playing fields and more particularly to artificial sports and amusement playing fields. The subject-matter disclosed may also relate to artificial surface covering panels of all kinds (i.e., artificial sports playing fields, artificial amusement playing fields, gymnasium surfaces, backyard surfaces, driveway surfaces and the like).

(b) Related Prior Art

In soccer or any other field sport, the use of synthetic turf has been growing steadily in recent years. The advantages of synthetic turf are numerous. For example, synthetic turf does not need as much care as real grass. Moreover, synthetic turf is more durable and, in some cases, even removable using panel systems.

However, synthetic turf without resilient infill can rarely be used directly on the floor or ground and they usually require padding layer panels of some sort. As it is known in the art, these padding layer panels can be made of different resilient materials and can have single or multiple layers. The synthetic turf and its attached padding layer panel usually come in full size rolls of 12' or 15' width. This width of roll creates heavy rolls especially when rolls are longer than 50' and requires fork lift or heavy equipment to be transported. An option to overcome this problem is to create smaller pieces like panels in the form of large rectangular panels that are placed, one adjacent to the next, in such a way as to cover the desired surface.

However, when the installation is not meant to be permanent, all the panels will need to be removed and reinstalled individually. This can be a long and expensive process depending of the frequency of installation of the panels.

One possible way to solve these aforementioned problems would be to use larger panels. This would reduce the number of panels required to cover a certain area but would add a burden on the persons charged with the installation of these larger but heavier panels.

There exists panels, such as the one found in FIG. 1. The panel includes a sheet member and a padding layer panel. The padding layer panel includes a plurality of padding layer panel elements, for allowing the panel to be rolled and unrolled. However, the materials used for the fabrication of such panels may be damaged on the site of installation and when manipulating, rolling and unrolling the panels. Moreover, the process to fabricate these panels can be complex and expensive.

On the other hand, for a plurality of other applications, artificial surface covering panels of all kinds (i.e., artificial sports playing fields, artificial amusement playing fields, gymnasium surfaces, backyard surfaces, driveway surfaces and the like) may be used. These panels need to be easy to install and reinstall, easy to manufacture, easy to roll and unroll, durable, fast to install and easy to manipulate. Many panels exist on the market to cover such surfaces. However, these panels are usually hard to manipulate, necessitate to be installed by more than one person, and are long and heavy to install.

There is therefore a need for improved surface covering panel assemblies and surface covering panels that are easy to manipulate, more flexible, more durable and faster to install.

SUMMARY

In some aspects, the techniques described herein relate to a panel assembly for installation over a receiving surface, including: —surface covering panels designed to be installed adjacent each other, each surface covering panel including: —a padding layer panel made of a first material; —a sheet member affixed to the padding layer panel, the sheet member having a first surface interfacing with the padding layer panel, edges extending beyond the padding layer panel, and a second surface opposed to the first surface; and—a first component of a fastening element affixed to the edges; and—joining padding layer panels, each joining padding layer panel designed to be mounted to side-by-side edges of adjacent surface covering panels, the joining padding layer panel including: —a body made of a second material different to the first material, a top surface, and a bottom surface; and—a second component of the fastening element affixed to the top surface of the joining padding layer, the first component and the second component of the fastening element adapted to interface with each other such as releasably attaching the joining padding layer panel to the edges of the adjacent surface covering panels, wherein the fastening element has a width designed to maintain fastening of the adjacent surface covering panels when the surface covering panels and the joining padding layer panels undergo thermal expansion resulting in shear displacement of the first component and of the second component relative to each other parallel to the sheet member.

In some aspects, the techniques described herein relate to a panel assembly, wherein the first material is one of a a) EPP expanded polypropylene, and b) HEPP Hybrid expanded polypropylene and polyethylene, and the second material is EPE expanded polyethylene.

In some aspects, the techniques described herein relate to a panel assembly, wherein the padding layer has a first thickness, the body of the joining padding layer panel has a second thickness, and wherein the first thickness is greater than the second thickness.

In some aspects, the techniques described herein relate to a panel assembly, wherein difference between the first thickness and the second thickness is greater than 1 mm.

In some aspects, the techniques described herein relate to a panel assembly, wherein difference between the first thickness and the second thickness is smaller than 5 mm.

In some aspects, the techniques described herein relate to a panel assembly, wherein the padding layer consists of a single rigid component.

In some aspects, the techniques described herein relate to a panel assembly, wherein the padding layer has a density of between 1.7 PCF and 2.1 PCF.

In some aspects, the techniques described herein relate to a panel assembly, where the body of the joining padding layer panel has a density of between 2.6 PCF and 3.0 PCF.

In some aspects, the techniques described herein relate to a panel assembly, wherein each of the padding layer and the body of the joining padding layer panel has a density, and wherein the density of the padding layer is greater than the density of the body of the joining padding layer panel of between 0.8 PCF and 1.0 PCF.

In some aspects, the techniques described herein relate to a panel assembly, wherein the fastening element includes a hook part and a loop part, each made of hydrophobic material.

In some aspects, the techniques described herein relate to a panel assembly, wherein the first component of the fastening element includes a back made of a material-type, wherein the back of the first component is affixed to the sheet member using an adhesive of the material-type.

In some aspects, the techniques described herein relate to a panel assembly, wherein the back of the first component of the fastening element is partially fused with the sheet member using suction.

In some aspects, the techniques described herein relate to a panel assembly, wherein the padding layer has a thickness, and is compressible to 50% of its thickness under a pressure of between 23 PSI and 70 PSI.

In some aspects, the techniques described herein relate to a panel assembly, wherein the body of the joining padding layer panel has a thickness, and is compressible to 50% of its thickness under a pressure of between 18 PSI and 35 PSI.

In some aspects, the techniques described herein relate to a method of manufacturing a panel assembly for installation over a receiving surface, including: —affixing a sheet member to a padding layer panel made of a first material and having a periphery, with the sheet member extending beyond the padding layer panel into edges; —affixing a first component of a fastening element to the edges, thereby obtaining a surface covering panel; —affixing a second component of the fastening element to a top surface of a body made of a second material, thereby obtaining a joining padding layer panel; and—attaching a number of joining padding layer panels to the edges to neighbor 50% of the periphery of the padding layer panel, thereby obtaining a padding layer panel assembly, wherein two padding layer panel assemblies can be assembled into a panel assembly by laying down the first the padding layer panel assembly over a receiving surface, and laying down the second padding layer panel assembly aside the first padding layer panel assembly with one edge free of a joining padding layer panel laid over a joining padding layer panel of the first padding layer panel assembly.

In some aspects, the techniques described herein relate to a method, wherein the step of affixing a first component of a fastening element to the edges wherein the first component has a porous back, includes using adhesive to affix the first component to the edge, laying down the back of the first component on the edge, placing a air-tight sheet over the surface covering panel, and applying suction to the surface covering panel thereby partially fusing the back of the first component to the sheet member.

In some aspects, the techniques described herein relate to a method, wherein the step of affixing a first component of a fastening element to the edges wherein the first component has a back of a material-type, including using adhesive of the material-type to affix the first component to the sheet material.

In some aspects, the techniques described herein relate to a method, wherein the first material is one of a a) EPP expanded polyethylene, and b) HEPP Hybrid expanded polypropylene and polyethylene, and the second material is EPE expanded polyethylene.

In some aspects, the techniques described herein relate to a method, wherein the padding layer has a density of between 1.7 PCF and 2.1 PCF.

In some aspects, the techniques described herein relate to a method, where the body of the joining padding layer panel has a density of between 2.6 PCF and 3.0 CPF.

According to an embodiment, there is provided a surface covering panel for assembly with at least another substantially identical surface covering panel for forming a surface covering panel assembly for installation over a receiving surface, the surface covering panel comprising: a top layer, wherein the top layer comprises a synthetic turf; a sheet member made of a first flexible material, the sheet member defining a first surface interfacing with the top layer and a second surface; and a padding layer panel made of a second flexible material, the padding layer panel defining a first surface partially covering and being bonded by heat or glued to the second surface defined by the sheet member and a second surface interfacing with the receiving surface; wherein the first flexible material and the second flexible material are of distinct natures; wherein the sheet member comprises, on its second surface not covered by the first surface of the padding layer panel, an edge comprising fastening material adapted for releasable attachment to one of the at least another substantially identical surface covering panel, and wherein the second surface of the sheet member entirely covers the first surface of the padding layer panel.

According to an aspect, the first flexible material and the second flexible material are both materials selected from a group of polymers and further wherein the material selected for the first flexible material is not the same material as the material selected for the second flexible material.

According to an aspect, the second flexible material is one selected from the group consisting of an expanded polypropylene, an extruded polypropylene, a foam, an expanded polytetrafluoroethylene, an extruded polytetrafluoroethylene, an expanded polyethylene, an extruded polyethylene, an ethylene propylene diene monomer (EPDM), a crumb rubber tire, a plastic, a natural rubber, a synthetic rubber, a polyurethane, a polyvinyl chloride (PVC), a shock absorbent material, a PVC mixed with a acrylonitrile-butadiene rubber (NBR) and ethylene vinyl acetate (EVA), and wherein the first flexible material is another one selected from the group consisting of an expanded polypropylene, an extruded polypropylene, a foam, an expanded polytetrafluoroethylene, an extruded polytetrafluoroethylene, an expanded polyethylene, an extruded polyethylene, an ethylene propylene diene monomer (EPDM), a crumb rubber tire, a plastic, a natural rubber, a synthetic rubber, a polyurethane, a polyvinyl chloride (PVC), a shock absorbent material, a PVC mixed with a acrylonitrile-butadiene rubber (NBR) and ethylene vinyl acetate (EVA), wherein the material selected for the first flexible material is not the same material as the material selected for the second flexible material.

According to an aspect, the top layer and the sheet member are integral, glued together or bonded by heat.

According to an aspect, the edge comprises more than two edges for releasable attachment to more than two of the at least another substantially identical surface covering panel.

According to an aspect, the first flexible material is more flexible than the second flexible material.

According to an aspect, the padding layer panel is at least 5 times thicker than the sheet member.

According to an aspect, the padding layer panel is a single-unitary member free from divisions separating it into separate parts.

According to an aspect, the edge which comprises the fastening material is substantially flat.

According to an aspect, the fastening material is made of a porous material bonded by glue to the sheet member, wherein the glue penetrates within the porous material to provide a mechanical bonding of the fastening material to the sheet member whereby glue penetrates within the porous material to bond to itself and to form bridges over portions of the porous material thereby ensuring that such portions are locked in under the glue.

According to an embodiment, there is provided a surface covering panel assembly for installation over a receiving surface, the surface covering panel assembly comprising: substantially identical surface covering panels, each one of the substantially identical surface covering panels comprising: a top layer, wherein the top layer comprises a synthetic turf; a sheet member made of a first flexible material, the sheet member defining a first surface interfacing with the top layer and a second surface; a padding layer panel made of a second flexible material, the padding layer panel defining a first surface partially covering and being bonded by heat or glued to the second surface defined by the sheet member and a second surface interfacing with the receiving surface; wherein the first flexible material and the second flexible material are of distinct natures; wherein the sheet member comprises, on its second surface not covered by the first surface of the padding layer panel, an edge; and wherein the second surface of the sheet member entirely covers the first surface of the padding layer panel; and joining padding layer panels, each one of the joining padding layer panels connecting the edge of one of the substantially identical surface covering panels with a corresponding edge of an adjacent surface covering panel.

According to an aspect, the first flexible material and the second flexible material are both materials selected from a group of polymers and further wherein the material selected for the first flexible material is not the same material as the material selected for the second flexible material.

According to an aspect, a width, defined by each one of the joining padding layer panels, substantially corresponds to a sum of a first width defined by the edge of the one of the substantially identical surface covering panels and a second width defined by the corresponding edge of the adjacent surface covering panel.

According to an aspect, the edge and one of: an upper side and an underside of the joining padding layer panels comprise a fastening material or a mating connector.

According to an aspect, the edge comprises a fastening material, wherein the fastening material is made of a semi porous material bonded by glue to the sheet member, wherein the glue penetrates within the semi porous material to provide a mechanical bonding of the fastening material to the sheet member whereby glue penetrates within the semi porous material to bond to itself and to form bridges over portions of the porous material thereby ensuring that such portions are locked in under the glue.

According to an aspect, the first flexible material is more flexible than the second flexible material.

According to an aspect, the padding layer panel is at least 5 times thicker than the sheet member.

According to an aspect, the padding layer panel is a single-unitary member free from divisions separating it into separate parts.

According to an aspect, the edge which comprises a fastening material and an upper side and an underside of the joining padding layer panels are substantially flat.

According to an embodiment, there is provided a surface covering panel for assembly with at least another substantially identical surface covering panel for forming a surface covering panel assembly for installation over a receiving surface, the surface covering panel comprising: a top layer; a sheet member made of a first flexible material, the sheet member defining a first surface interfacing with the top layer and a second surface; and a padding layer panel made of a second flexible material, the padding layer panel defining a first surface partially covering the second surface defined by the sheet member and a second surface interfacing with the receiving surface; wherein the first flexible material and the second flexible material are of distinct natures; wherein the sheet member comprises, on its second surface not covered by the first surface of the padding layer panel, an edge comprising fastening material adapted for releasable attachment to one of the at least another substantially identical surface covering panel; wherein the second surface of the sheet member entirely covers the first surface of the padding layer panel; and wherein the padding layer panel is a single-unitary member free from divisions separating it into separate parts.

According to an embodiment, there is provided a surface covering panel for assembly with at least another substantially identical surface covering panel for forming a surface covering panel assembly for installation over a receiving surface and under a top layer, the surface covering panel comprising: a sheet member made of a first flexible material, the sheet member defining a first surface for interfacing with the top layer and a second surface; a padding layer panel made of a second flexible material, the padding layer panel defining a first surface for partially covering the second surface defined by the sheet member and a second surface for interfacing with the receiving surface; and an edge being adapted for releasable attachment to the at least another substantially identical surface covering panel.

According to another embodiment, the second flexible material comprises at least one of: an expanded polypropylene, an extruded polypropylene, a foam, an expanded polytetrafluoroethylene, an extruded polytetrafluoroethylene, an expanded polyethylene, an extruded polyethylene, an ethylene propylene diene monomer (EPDM), a crumb rubber tire, a plastic, a natural rubber, a synthetic rubber, a polyurethane, a polyvinyl chloride (PVC), a shock absorbent material, a PVC mixed with a acrylonitrile-butadiene rubber (NBR) and ethylene vinyl acetate (EVA).

According to a further embodiment, the top layer comprises at least one of: a carpet-like top layer, a synthetic turf, PVC, PVC mixed with NBR rubber sheet, a geotextile fabric, a rubber-like top layer, a water-resistant top layer, a mat-like type top layer and a snow melt top layer.

According to yet another embodiment, the edge comprises more than two edges for releasable attachment to more than two of the at least another substantially identical surface covering panel.

According to a further embodiment, the surface covering panel further comprises an extension member outwardly extending from the sheet member for releasably attaching with at least another substantially identical surface covering panel.

According to yet another embodiment, the top layer and the sheet member are one of: integral, glued together and bonded together.

According to another embodiment, the edge comprises at least one of: a fastening material and a mating connector.

According to a further embodiment, the fastening material comprises at least one of: a hook and loop material, a Velcro™ hook material, a Velcro™ loop material, a Velcro™ mushroom-like shape material, nylon, polyester and polypropylene.

According to yet another embodiment, the sheet member, the padding layer panel and the top layer are configured to be one of: rolled and unrolled between a rolled position and a surface covering position.

According to another embodiment, there is provided a surface covering panel assembly for installation over a receiving surface and under a top layer, the surface covering panel assembly comprising: substantially identical surface covering panels, each one of the substantially identical surface covering panels comprising: a sheet member made of a first flexible material, the sheet member defining a first surface for interfacing with the top layer and a second surface; a padding layer panel made of a second flexible material, the padding layer panel defining a first surface for partially covering the second surface defined by the sheet member and a second surface for interfacing with the receiving surface; and an edge being adapted for releasable attachment to at least another one of the substantially identical surface covering panels.

According to a further embodiment, the surface covering panel assembly further comprises joining padding layer panels, each one of the joining padding layer panels connecting the edge of one of the substantially identical surface covering panels with a corresponding edge of an adjacent surface covering panel.

According to yet another embodiment, a width, defined by each one of the joining padding layer panels, substantially corresponds to a sum of a first width defined by the edge of the one of the substantially identical surface covering panels and a second width defined by the corresponding edge of the adjacent surface covering panel.

According to another embodiment, the second flexible material and the joining padding layer panels comprise at least one of: an expanded polypropylene, an extruded polypropylene, a foam, an expanded polytetrafluoroethylene, an extruded polytetrafluoroethylene, an expanded polyethylene, an extruded polyethylene, an ethylene propylene diene monomer (EPDM), a crumb rubber tire, a plastic, a natural rubber, a synthetic rubber, a polyurethane, a polyvinyl chloride (PVC), a shock absorbent material, a PVC mixed with a acrylonitrile-butadiene rubber (NBR) and ethylene vinyl acetate (EVA).

According to yet another embodiment, the edge and one of: an upper side and an underside of the joining padding layer panels comprise at least one of: a fastening material and a mating connector.

According to another embodiment, the fastening material comprises at least one of: a hook and loop material, a Velcro™ hook material, a Velcro™ loop material, a Velcro™ mushroom-like shape material, nylon, polyester and polypropylene.

According to a further embodiment, the one of: the upper side and the underside of the joining padding layer panels, comprises a Velcro™ loop material and the edge comprises a Velcro™ hook material with a laminated textile material.

According to yet another embodiment, the top layer comprises at least one of: a carpet-like top layer, a synthetic turf, PVC, PVC mixed with NBR rubber sheet, a geotextile fabric, a rubber-like top layer, a water-resistant top layer, a mat-like type top layer and a snow melt top layer.

According to a further embodiment, the edge comprises more than two edges for releasable attachment to more than two of the at least another one of the substantially identical surface covering panels.

According to yet another embodiment, the top layer and the sheet member are one of: integral, glued together and bonded together.

According to another embodiment, the sheet member, the padding layer panel and the top layer of each one of the substantially identical surface covering panels are configured to be one of: rolled and unrolled between a rolled position and a surface covering position.

According to another embodiment, there is provided a surface covering panel assembly for installation over a receiving surface and under a top layer, the surface covering panel assembly comprising: substantially identical surface covering panels, each one of the substantially identical surface covering panels comprising: a sheet member made of a first flexible material, the sheet member defining a first surface for interfacing with the top layer and a second surface; a padding layer panel made of a second flexible material, the padding layer panel defining a first surface for partially covering the second surface defined by the sheet member and a second surface for interfacing with the receiving surface; and an edge being adapted for releasable attachment to at least another one of the substantially identical surface covering panels; and joining padding layer panels, each one of the joining padding layer panels connecting the edge of one of the substantially identical surface covering panels with a corresponding edge of an adjacent surface covering panel.

According to an embodiment, there is provided a surface covering panel assembly for installation over a receiving surface, the surface covering panel assembly comprising: a pair of surface covering panels each comprising: a top layer comprising a synthetic turf (16); a sheet member (18) made of a first flexible material, the sheet member comprising: a first surface interfacing with the top layer; and a second surface comprising a first area and a second area, wherein the second area is covered with a mating component; a padding layer panel (24) made of a second flexible material, with the first flexible material and the second flexible material being made of distinct materials, the padding layer panel comprising: a first surface permanently bonded to the first area of the sheet-member second surface; and a second surface interfacing with the receiving surface; a joining padding layer panel comprising: an upper side comprising a mating component complementary to the sheet-member mating components, wherein the mating components of the sheet member and of the joining padding layer panel are releasably interfacing each other; and wherein the upper side interfaces with at least part of the second area of the second surface of each of the pair of surface covering panels; and an underside interfacing with the receiving surface.

According to an aspect, the second area of a first one of the pair of surface covering panels comprises a plurality of edges, at least two bands part of the second area and each located about one of the edges, wherein the joining padding layer panel interfaces with a single one of the bands of each one of the pair of surface covering panels, thereby releasably connecting the pair of surface covering panels.

According to an aspect, wherein each one of the bands has a width defined between the edge and the first area, wherein the joining padding layer panel has two opposite edges and a width according to these edges, and wherein the width of the joining padding layer panel is between about 1.25 times and 2 times the width of the band.

According to an aspect, the complementary mating components comprise one of: a combination of complementary fastening materials; and a combination of complementary mating connectors.

According to an aspect, the complementary fastening materials comprises one of: a hook and loop material, a hook material, a loop material, a mushroom shape material, nylon, polyester or polypropylene.

According to an aspect, the fastening material comprises a hook material with a laminated textile material.

According to an aspect, the (sheet-member) mating component comprises a porous material bonded by glue to the sheet member, wherein the glue penetrates within the porous material to provide a strong mechanical bonding between the fastening material and the sheet member.

According to an aspect, the plurality of bands comprises the first surface covering panel which comprises: a first band to join the pair of surface covering panels together through the joining padding layer panel, and a second band to join the first one of the pair of surface covering panels to another surface covering panel the through another joining padding layer panel, thereby joining the three surface covering panels together.

According to an aspect, the top layer and the sheet member are integral, glued together or bonded by heat.

According to an aspect, at least one of the edges has a non-linear shape.

According to an aspect, each one of the surface covering panels has a longitudinal orientation, a transversal orientation, a longitudinal edge and a transversal edge, and wherein the surface covering panel assembly may be mounted at least one of: offset from each other with either one of the longitudinal edges and the transversal edges of the pair of surface covering panels being not aligned, and having the longitudinal edge of a first one of the pair of surface covering panels abutting the transversal edge of the other one of the pair of surface covering panels.

According to an aspect, the second area offers a level surface.

According to an aspect, the assembly has a flexibility allowing the assembly to be rolled in its assembled configuration comprising the pair of surface covering panels and the joining padding layer panel interfacing with each other.

According to an aspect, the complementary mating components allow displacement of the sheet member relative to the joining padding layer panel without rupture of the releasable interfacing of the sheet member with the joining padding layer panel.

According to an aspect, the surface covering panels have a longitudinal orientation and a transversal orientation, and wherein the interfacing of the mating components allows relative displacement both in the longitudinal orientation and in the transversal orientation.

According to an embodiment, there is provided a surface covering panel assembly for installation over a receiving surface, the surface covering panel assembly comprising: a pair of surface covering panels each comprising: a top layer comprising a synthetic turf (16); a sheet member (18) made of a first flexible material; and a padding layer panel (24) made of a second flexible material with first flexible material and the second flexible material being made of distinct materials; and a joining padding layer panel having an upper side and an underside; wherein the sheet member comprises: a first surface interfacing with the top layer; a second surface comprising a core area and a peripheral area, with the second surface interfacing with the padding layer in a core area, and with the second surface comprising a mating component in the peripheral area; and wherein the upper side of the joining padding layer panel comprises a mating component complementary to the sheet member mating component, and wherein the complementary mating components of the sheet member and the joining padding layer panel are releasably interfacing with each other.

According to an aspect, at least part of the peripheral area comprises a plurality of edges, wherein the peripheral area comprises at least two bands each located about one of the edges, and wherein the joining padding layer panel interfaces with a band of each one of the pair of surface covering panels, thereby releasably connecting the pair of surface covering panels.

According to an aspect, the surface covering panel assembly further comprises: a third surface covering panel; and a second joining padding layer panel; and wherein the plurality of bands comprise: a first band to join the pair of surface covering panels together through the first joining padding layer panel; a second band to join the first surface covering panels the third surface covering panel through the second joining padding layer panel, thereby joining the three surface covering panels together.

According to an aspect, the assembly has a flexibility allowing the assembly to be rolled in its assembled configuration comprising the pair of surface covering panels and the joining padding layer panel interfacing with each other.

According to an aspect, the surface covering panels have a longitudinal orientation, a transversal orientation, a longitudinal edge and a transversal edge, and wherein the surface covering panel assembly may be mounted at least one of: offset from each other with either one of the longitudinal edges and the transversal edges of the pair of surface covering panels being not aligned, and having the longitudinal edge of a first one of the pair of surface covering panels abutting the transversal edge of the other one of the pair of surface covering panels.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 1 is a bottom perspective view of a surface covering panel in its partially rolled position in accordance with the prior art;

It will be noted that throughout the appended drawings, like features are identified by like reference numerals.

DETAILED DESCRIPTION

In embodiments there are disclosed surface covering panels, surface covering panel assemblies and methods of installing the same. The surface covering panel and/or the surface covering panel assembly can be rolled and unrolled as desired.

Figure 2A:
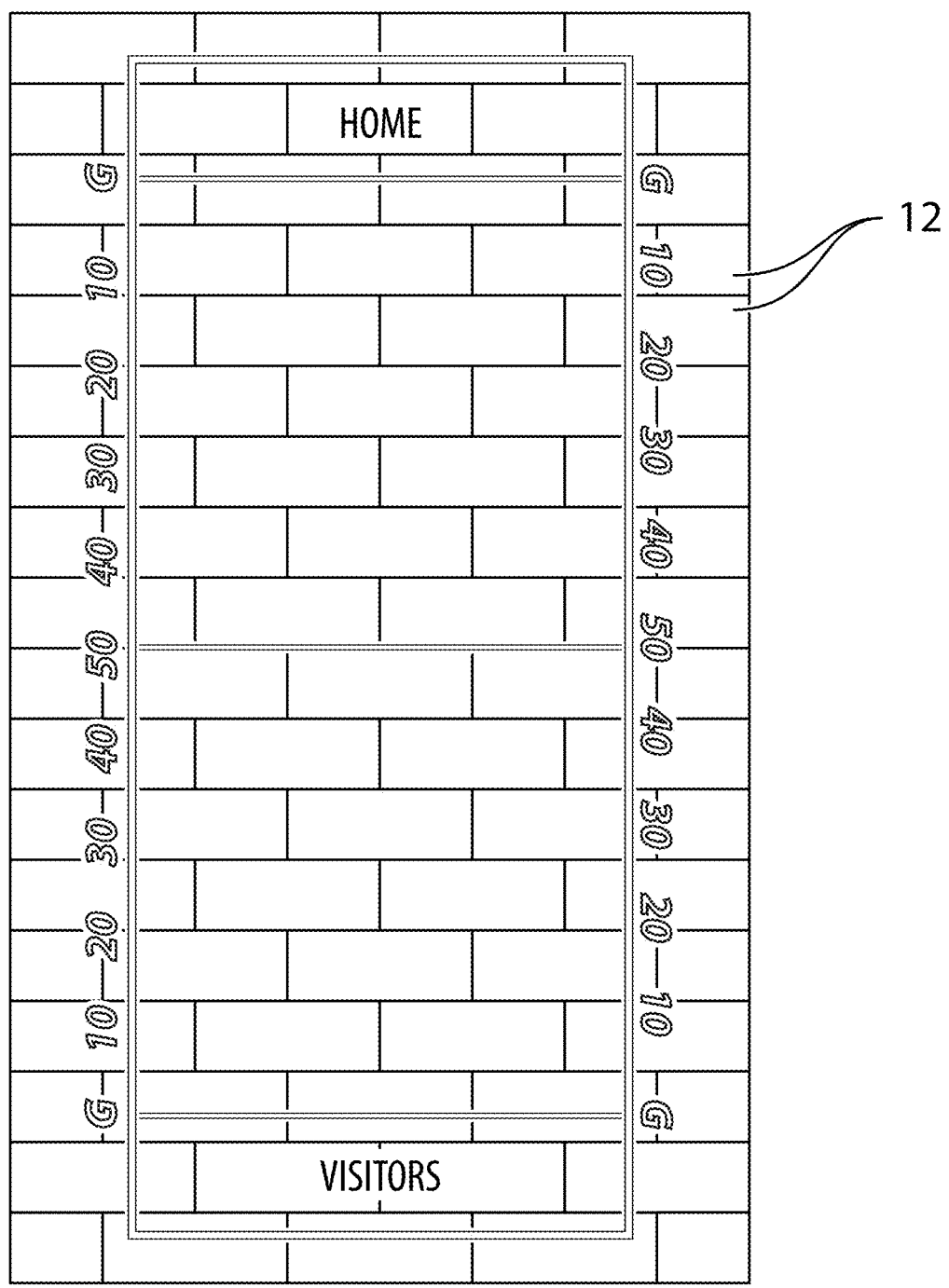
FIG. 2A is a top plan view of an artificial sports playing field in accordance with an embodiment.

Referring now to the drawings and more particularly to FIG. 2A, there is shown an artificial sports playing field in accordance with an embodiment. As shown in FIG. 2A, a plurality of aligned and/or adjacent surface covering panels 12 forms the artificial sports playing field. It is to be noted that the artificial sports playing field on FIG. 2A represents an artificial sports playing field used for football, but that the artificial sports playing field may be any other type of artificial sports playing field such as, without limitation, an artificial soccer playing field, an artificial track and field playing field, an artificial basketball playing field, an artificial tennis playing field, and the like. It is to be noted that the surface covering panels 12 of FIG. 2A are not drawn to scale; their dimensions in FIG. 2A relative to other references in the figure (e.g., the references to yard positions on the sports playing field) are not representative of reality. Thus, if FIG. 2A represented reality, the surface covering panels 12 would be drawn smaller in size for most embodiments.

Figure 2B:
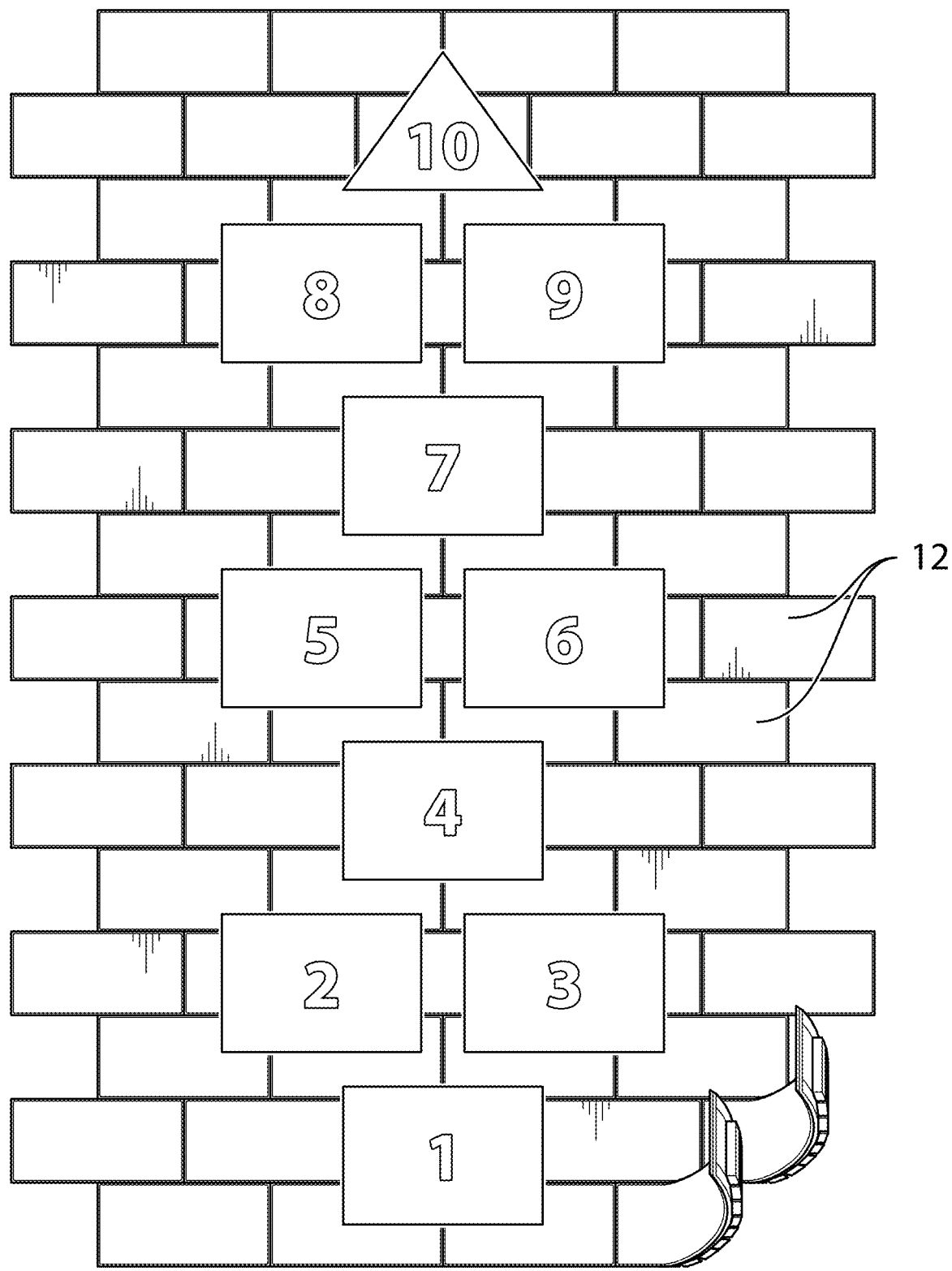
FIG. 2B is a top plan view of an artificial amusement playing field in accordance with another embodiment.

As shown in FIG. 2B, there is shown an artificial amusement playing field in accordance with another embodiment. As shown in FIG. 2B, a plurality of aligned and/or adjacent surface covering panels 12 form the artificial amusement playing field. It is to be noted that the artificial amusement playing field on FIG. 2B represents an artificial sports playing field used for hopscotch, but that the artificial amusement playing field may be any other type of artificial amusement playing field such as, without limitation, an artificial snakes and ladders playing field, an artificial amusement playing field in a children area, an artificial gymnasium playing field area, an artificial backyard playing field, and the like.

Figure 3:
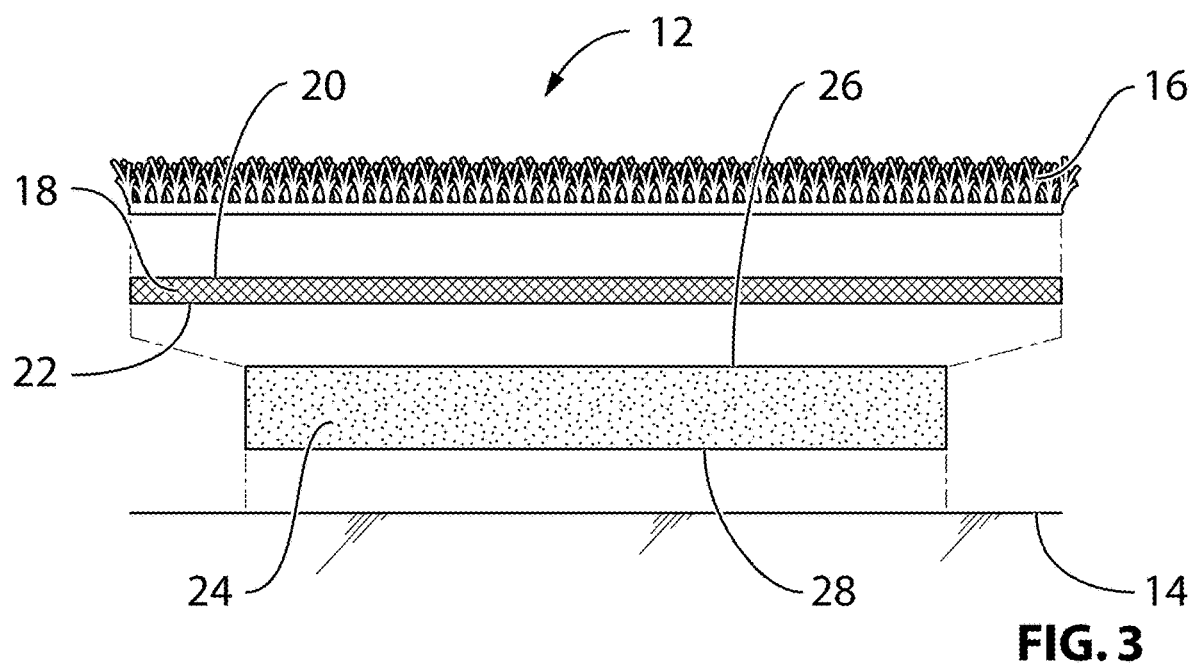
FIG. 3 is a front elevation exploded view of a surface covering panel in accordance with another embodiment.

Referring now to FIG. 3, there is shown a surface covering panel 12 in more details. The surface covering panel 12 is for assembly with other substantially identical surface covering panels 12 for forming a surface covering panel assembly 10 (FIGS. 2A, 2B, 5, 9 and 10) for installation over a receiving surface 14 and under a top layer 16 (i.e., here a carpet-like top layer 16). As shown, the surface covering panel 12 includes a sheet member 18 which is made of a first flexible material. The sheet member 18 defines a first surface 20 which is for interfacing with the top layer 16 or carpet-like top layer 16 and a second surface 22. The surface covering panel 12 further includes a padding layer panel 24 which is made of a second flexible material. According to an embodiment, the padding layer panel 24 is or is formed of a single, unitary member (aka one-piece); i.e., it is free from regular or repeating cuts or gaps therethrough that would substantially change its flexibility characteristics and free from divisions separating it into separate parts. It should also be noted that, according to an embodiment, the padding layer panel 24, to an embodiment, the padding layer panel 24, the sheet member 18 and the joining padding layer panel 32 have a substantially uniform thickness and the joining padding layer panel 32 have a substantially uniform thickness. According to an embodiment, the padding layer panel 24 and the joining padding layer panel 32 are of the same substantially uniform thickness while the sheet member 18 is of a substantially smaller uniform thickness (i.e., more than 5 times thinner). According to an embodiment, the joining padding layer panel 32 are completely or at least substantially flat. The joining padding layer panel 32 are free from gaps or extensions.

The padding layer panel 24 defines a first surface 26 which is for partially covering the second surface 22 which is defined by the sheet member 18, more precisely covering a first area or core area of the second surface 22 of the sheet member 18. The padding layer panel 24 further defines a second surface 28 which is for interfacing with the receiving surface 14 (i.e., a ground surface, a sport field, a playground, a backyard environment, and the like). The surface covering panel 12 also includes edges 30 that are not bound to the padding layer panel 24, and that form a second area or peripheral area of the second surface 22 of the sheet member 18. According to an embodiment, the edges 30 are completely or at least substantially flat. The edges 30 are free from gaps or extensions. At least one of the edges 30 is adapted for attaching or connecting with one of the other substantially identical surface covering panels 12 through the use of a joining padding layer panel 32 as will be described in detail hereinafter. It is to be noted that the top layer 16 or carpet-like top layer 16 and the sheet member 18 may be integral such as to form one layer of material only.

According to one embodiment, the second flexible material of the padding layer panel 24 may include, without limitation, one of an expanded polypropylene, an extruded polypropylene, a foam, an expanded polytetrafluoroethylene, an extruded polytetrafluoroethylene, an expanded polyethylene, an extruded polyethylene, an ethylene propylene diene monomer (EPDM), a crumb rubber tire, a plastic, a natural rubber, a synthetic rubber, a polyurethane, a polyvinyl chloride (PVC), a PVC mixed with an acrylonitrile-butadiene rubber (NBR), any combination and the like. It is also to be noted that, according to an embodiment, the first flexible material of the sheet member 18 can correspond to the second flexible material of the padding layer panel 24. According to other embodiments, the first flexible material of the sheet member 18 is different from the second flexible material of the padding layer panel 24.

Figure 4:
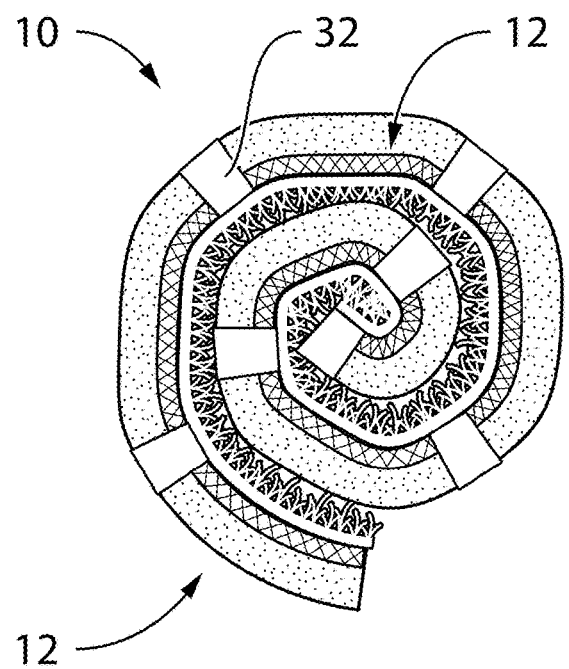
FIG. 4 is a front elevation view of a surface covering panel assembly in accordance with another embodiment, the surface covering panel assembly being in its rolled position.

According to a further embodiment, FIG. 4 shows a surface covering panel assembly 10 which is in its rolled position. As shown, the surface covering panel assembly 10 is composed of a plurality of padding layer panels 24 attached to a plurality of sheet members 18. The plurality of surface covering panels 12 are releasably attached or fastened together via a joining padding layer panel 32, which will be described hereinbelow in more details.

According to one embodiment, the padding layer panels 24 are preferably glued to the sheet members 18 but other suitable means of attachment can be used. According to another embodiment, if both the padding layer panels 24 and the sheet members 18 are made of a polymeric material, they may be bonded together. In certain examples, they may be bonded together by heat.

It is to be noted that the length and width of the surface covering panel 12 may be selected as to best fit the specific use of the surface covering panel 12. Each sheet member 18 and padding layer panel 24 may be made more or less wide and the surface covering panel 12 may be made more or less long. The weight of the surface covering panel 12 and the ease of manipulation can thus be controlled for specific applications.

It is also to be noted that that the sheet member 18 may receive any carpet-like top layer 16 such as, without limitation, any useful surface covering such as carpet, synthetic turf, PVC, PVC mixed with NBR rubber sheet, geotextile fabric, and the like. As long as the sheet member 18 with or without its respective carpet-like top layer 16 is sufficiently flexible and resilient to be rolled and unrolled without being damaged.

As mentioned above, when the padding layer panel 24 of the surface covering panel 12 serves as an underpad for the surface covering panel 12, the padding layer panel 24 is preferably made of a shock absorbent material. Thus, padding layer panels 24 may be made of any suitable materials, each of the suitable materials including different shock absorbing characteristics.

Figure 5:
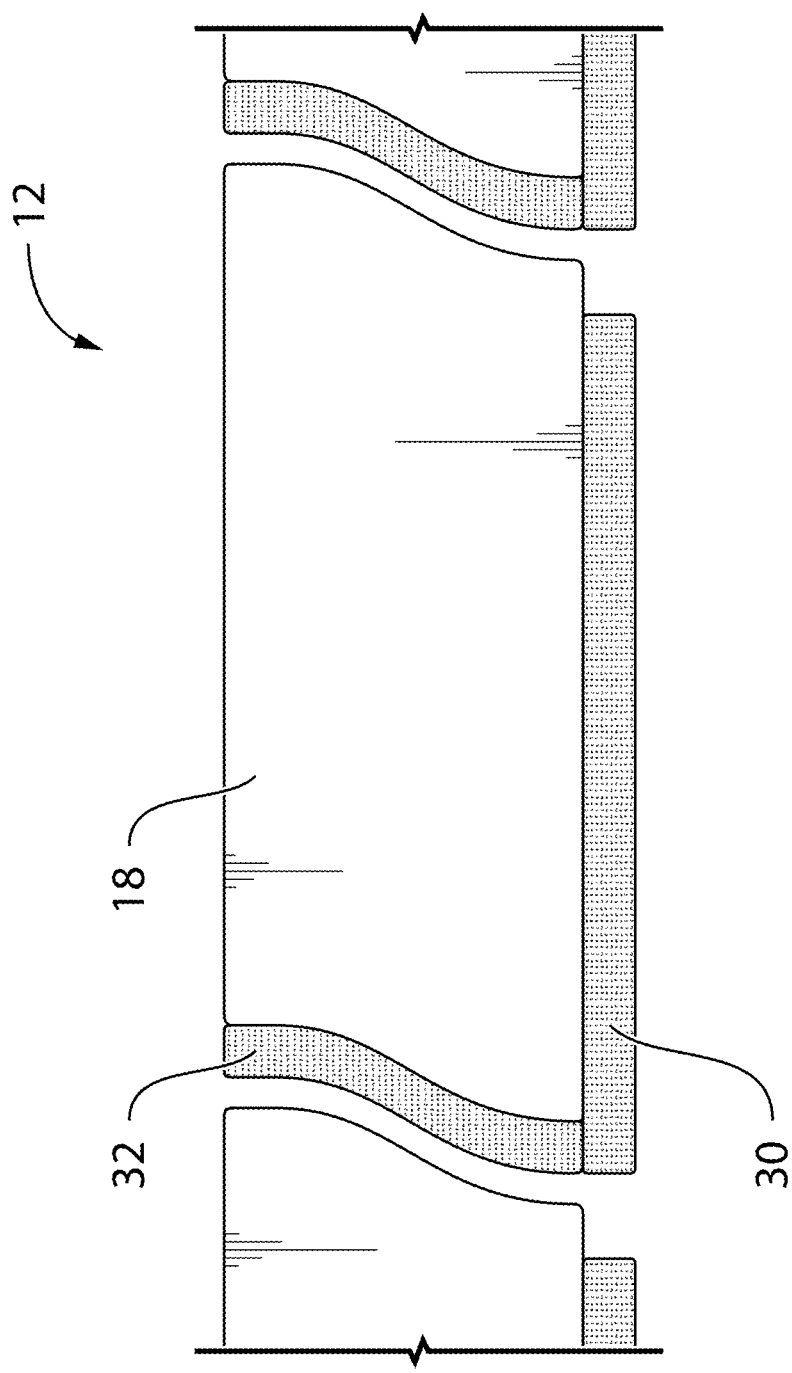
FIG. 5 is a bottom plan view of a surface covering panel assembly in accordance with another embodiment, the surface covering panel assembly being in its covering position.

Referring now to FIG. 5, there is shown a surface covering panel assembly 10 which includes a plurality (three) surface covering panels 12 in accordance with another embodiment. As shown, each surface covering panel 12 includes a padding layer panel 24 made of the second flexible material which is fixedly attached to a sheet member 18 made of the first flexible material. Each surface covering panel 12 further defines edges 30 for allowing the connection of adjacent surface covering panels 12.

Figure 6:
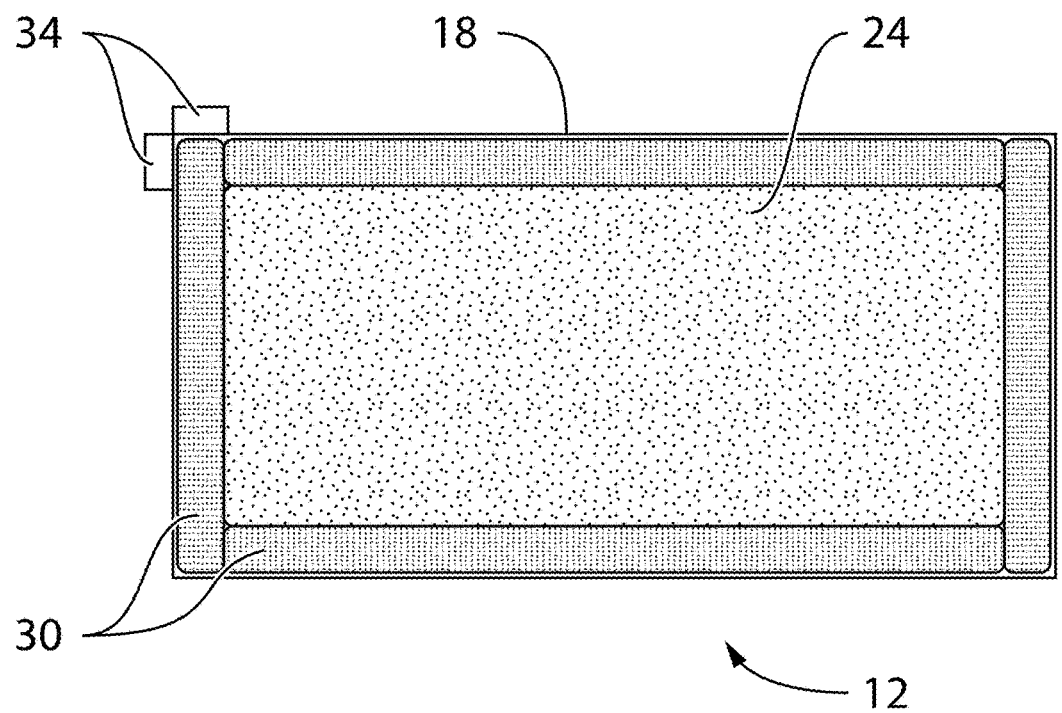
FIG. 6 is a bottom plan view of a surface covering panel in accordance with another embodiment.

Referring now to FIG. 6, there is shown a surface covering panel 12 in accordance with another embodiment. As shown, the surface covering panel 12 includes a padding layer panel 24 made of the second flexible material which is fixedly attached to a sheet member 18 made of the first flexible material. Additionally, the sheet member 18 includes extension members 34 which extend in the fore sides beyond the area covered by the padding layer panel 24. These extension members 34 may be used as fastening means. The surface covering panel 12 further defines edges 30 for allowing the connection of adjacent surface covering panels 12. For example, the extension members 34 and edges 30 may include mating components such as Velcro™ bands to be fixedly attached to an underside of the extension members 34 of the sheet member 18 that extends beyond the padding layer panel 24. The Velcro™ bands are preferably made of a porous material allowing glue penetration for a better mechanical bonding. In fact, in this embodiment, glue penetrates sufficiently within the porous material to bond to itself. That is, the glue forms bridges over parts or portions of the porous material thereby ensuring that such parts or portions are locked in under the glue. Thus, since hook and loop material (i.e., Velcro™) does not have a backing (as it normally does), the glue does not need to be adapted to both the backing of the hook and loop material (i.e., Velcro™) and the material to which it is to be bonded (i.e., the material of one of: the sheet member 18, the padding layer panel 24, and the joining padding layer panel 32). The glue selection is made to have good bond characteristics with the material the sheet member 18, the padding layer panel 24, or the joining padding layer panel 32. The glue is not necessarily the same for each of the foregoing parts.

The Velcro™ bands may be similar to Velcro™ 3001 bands or Velcro™ 1000 bands with a polyurethane binder coat. It is to be noted that it is not a need that the sheet member 18 extends beyond all four sides of the surface covering panel 12. Only, one, two, three or more edges 30 of the surface covering panel 12 may be uncovered by the padding layer panel 24.

Figure 7:
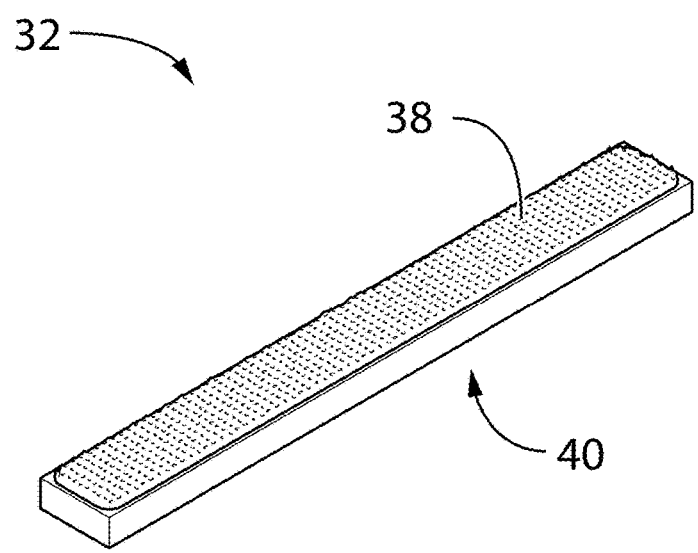
FIG. 7 is a bottom perspective view of a joining padding layer panel in accordance with another embodiment.
Figure 9:
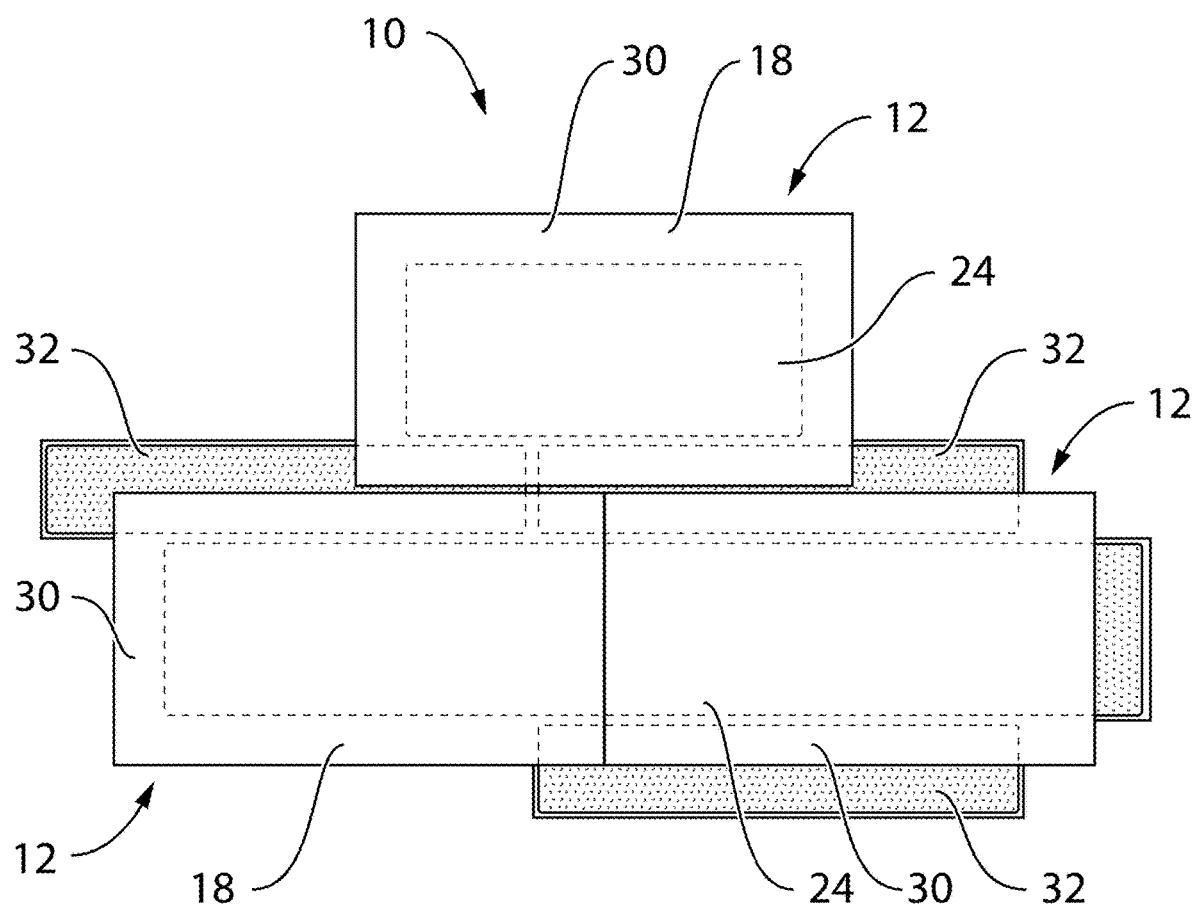
FIG. 9 is a top plan view of a surface covering panel assembly in accordance with another embodiment, where the padding layer panels are shown in dotted lines.
Figure 10:
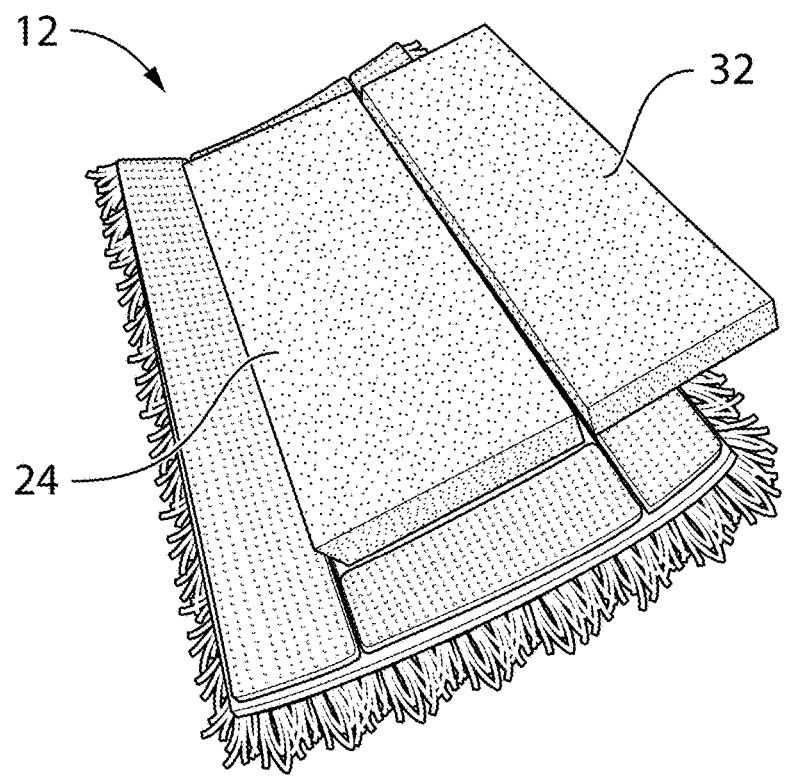
FIG. 10 is a bottom perspective view of a surface covering panel assembly in accordance with another embodiment, showing a surface covering panel and its adjacent joining padding layer panel.

When a plurality of surface covering panels 12 are needed to cover a given receiving surface 14, adjacent surface covering panels 12 are connected together to provide a user with a surface covering panel assembly 10. Referring now to FIG. 9, there is shown a surface covering panel assembly 10 for installation over a receiving surface 14 and a top layer 16 or under a carpet-like top layer 16. The surface covering panel assembly 10 includes a plurality of substantially identical surface covering panels 12 as defined above. Each one of the surface covering panels 12 includes one or more edges 30, where at least one of the edges 30 is to be connected to an adjacent surface covering panel 12. The surface covering panel assembly 10 further includes a plurality of joining padding layer panels 32 (FIGS. 7 and 10). Each one of the plurality of joining padding layer panels 32 connects an edge 30 of one surface covering panel 12 with a corresponding edge 30 of an adjacent surface covering panel 12.

As shown in FIG. 7, the joining padding layer panel 32 may be a single padding layer panel which has an upper side 38 and an underside 40. The upper side 38 includes a mating component or fastening material, preferably a Velcro™ band which is complementary with the Velcro™ band of the edges 30 of the surface covering panel 12.

According to an embodiment, the Velcro™ is preferably a hook and loop material with a laminated textile material. The fastening material may include any suitable material, such as, without limitation, nylon, polyester or polypropylene of type HTH 868 or equivalent, any suitable combination, and the like. For permanent installation of the surface covering panel assembly 10, the Velcro™ hook may have a mushroom-like shape of brand Velcro™ 87-S or similar. It is to be noted that the fastening material of the joining padding layer panel 32 and the fastening material of the edges 30 of the surface covering panel 12 may include any suitable material, such as to allow a releasable connection between the upper side 38 of the joining padding layer panel 32 and the surface covering panel 12. It is also to be mentioned that the fastening materials of the joining padding layer panel 32 and of the surface covering panel 12 may be interchangeable.

Figure 8:
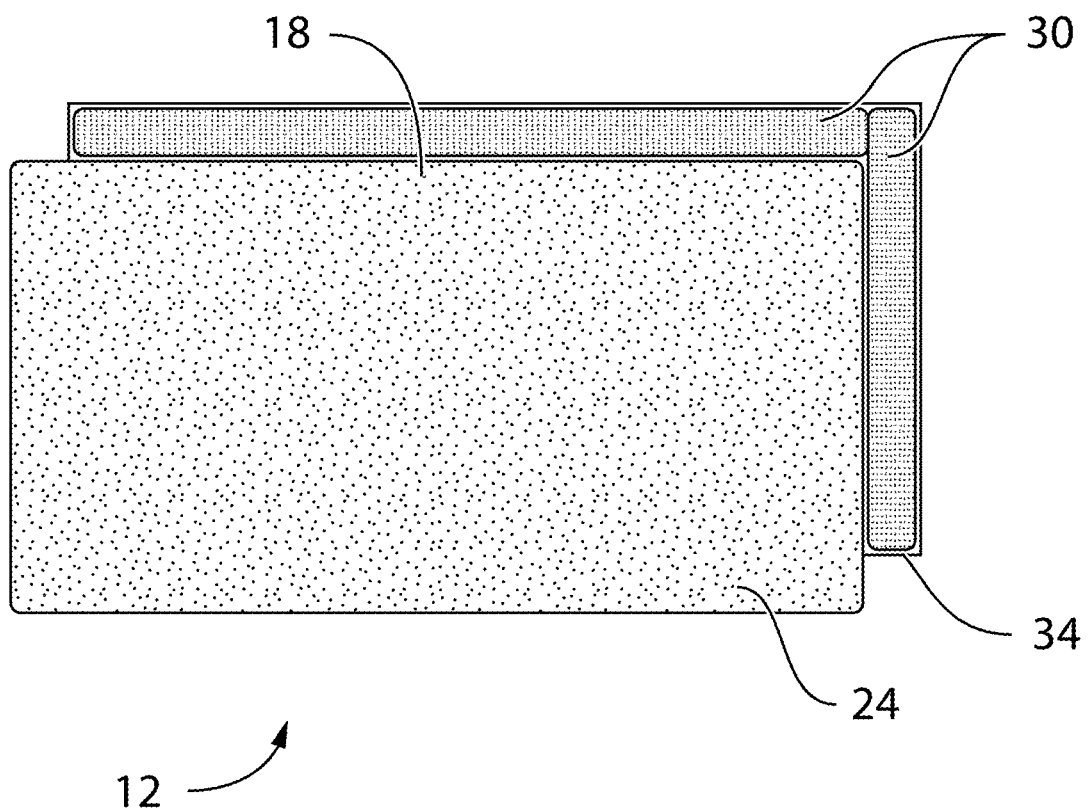
FIG. 8 is a bottom plan view of a surface covering panel in accordance with another embodiment.

According to another embodiment and referring now to FIG. 8, there is shown that the sheet member 18 extends beyond two sides only of the surface covering panel 12 such as to allow the sheet member 18 to be offset from the padding layer panel 24. This configuration eliminates the need of additional fastening material on the edges other than edges 30 of the sheet member 18 of the surface covering panel 12. Thus, FIG. 8 shows a bottom plan view of the edges 30 of the surface covering panel 12. The edges 30 are simply defined by the padding layer panel 24 glued offset from the sheet member 18. The edges 30 may include, as defined above, Velcro™ bands. The Velcro™ bands preferably include a Velcro™ hook material with a laminated textile material. The band edges may include any suitable material, such as, without limitation, nylon, polyester or polypropylene of type HTH 868 or equivalent. For permanent installation, Velcro™ hook can include a mushroom-like shape of brand Velcro™ 87-S or similar. Other fastening material could be used. For example, edges 30 may include a mating connector for releasably connecting with corresponding mating connectors on other edges 30 of another surface covering panel 12 or with corresponding mating connectors on the upper side 38 of the joining padding layer panel 32. Although not shown in FIG. 8, it is to be noted that the top plan view of the surface covering panel 12 would be very similar to the bottom plan view. There would also be an edge 30. However, edges 30 would be on the padding layer panel 24 and include the corresponding material to edges 30 on the sheet member 18; i.e., edges on top comprise the hook material while those on the bottom comprise the loop material corresponding thereto (or vice versa).

It is to be noted that there is a need to glue the fastening materials of the surface covering panel 12 or of the joining padding layer panel 32 on the sheet member 18 or on the joining padding layer panel 32. To facilitate some specific applications, the fastening material could be a sheet of a fastening material glued on the joining padding layer panel 32 and/or on the sheet member 18 of the surface covering panel 12.

The width of the joining padding layer panels 32 generally corresponds to the width of edges 30 of adjacent surface covering panels 12 (i.e., the sum of a first width (one of the edges 30) and a second width (another one of the edges 30)). Thus, to join two adjacent surface covering panels 12 together, one or more joining padding layer panels 32 should be installed between each adjacent surface covering panel 12 as shown in FIG. 10. The complementarities of the fastening materials of the joining padding layer panels 32 and of the surface covering panel 12 generate a strong connection between adjacent surface covering panels 12 and thus prevent any gap to be created between adjacent surface covering panels 12.

It is to be understood that the length of each joining padding layer panel 32 may differ to allow any suitable combination of connections between the surface covering panels 12. For example, in FIG. 10, there are shown two different types of joining padding layer panels 32, a regular joining padding layer panel, which preferably extends at least the full length of the sheet member 18, and the transverse joining padding layer panel, which preferably extends the full width of the surface covering panels 12.

It is to be noted that the surface covering panels 12 and the surface covering panel assemblies 10 may be used for indoor applications, outdoor applications or both. Thus, sheet members 18 and padding layer panels 24 may further include draining holes and channels (not shown) for allowing drainage of the surface covering panel assembly 10 when installed on the receiving surface 14 to be covered. The draining holes in the sheet members 18 may be preferably aligned with the draining holes in the padding layer panels 24.

It is also to be noted that the surface covering panel 12 and/or the surface covering panel assemblies 10 may be rolled and unrolled between a rolled position (i.e., to be transported, to be stored and the like) and a covering position (i.e., for covering the receiving surface). For example, a user can decide to install a surface covering panel assembly 10 to cover a receiving surface 14, such as, for example, a sports field or an amusement field. When the user needs to transport, or to store the surface covering panel assembly 10, the user may decide to roll the entirety of the surface covering panel assembly 10. However, this can lead to a huge rolled surface covering panel assembly 10. Thus, the user may decide to disconnect some surface covering panels 12 or adjacent surface covering panel assemblies 10 with their adjacent surface covering panel 12 for allowing him to roll a much smaller and lighter surface covering panel assembly 10. The user can also decide to manipulate each panel individually as a panel system.

According to another embodiment, the sheet member 18 may be a flexible floor covering.

According to another embodiment, the sheet members 18 and the padding layer panels 24 may be glued together using a flame treatment process prior application of glue or an adhesive. The glue may include one of: urethane with one or two components, acrylic, an olefin base hot melt, any combination and the like.

According to another embodiment, the surface defined by the sheet member 18 may be greater than the surface defined by the padding layer panel 24. Furthermore, the surface defined by the sheet member 18 may define a portion which extends beyond at least one side of the surface defined by the padding layer panel 24.

Figure 11:
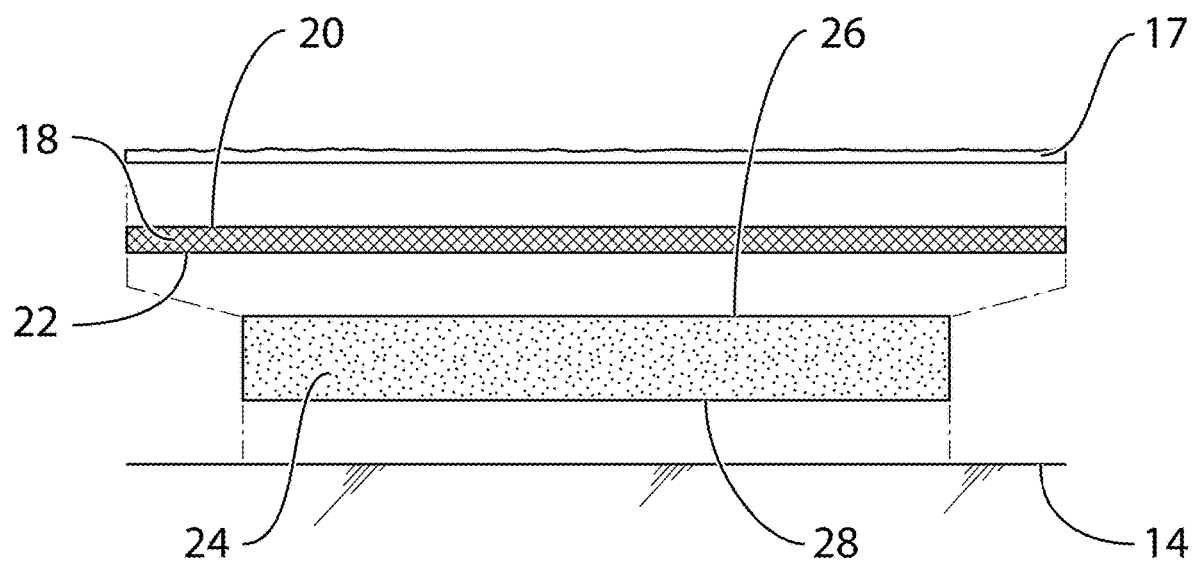
FIG. 11 is a front elevation exploded view of a surface covering panel in accordance with another embodiment.

Referring now to FIG. 11, there is shown a surface covering panel 12 in accordance with another embodiment for creating an artificial amusement playing field (FIG. 2A). The surface covering panel 12 is for assembly with other substantially identical surface covering panels 12 for forming a surface covering panel assembly 10 (FIGS. 2A, 2B, 5, 9 and 10) for installation over a receiving surface 14 and under a top layer 17 (i.e., here an amusement top layer 17). As shown, the surface covering panel 12 includes a sheet member 18 which is made of a first flexible material. The sheet member 18 defines a first surface 20 which is for interfacing with the top layer 17 (or amusement top layer 16 in previous figures) and a second surface 22. The surface covering panel 12 further includes a padding layer panel 24 which is made of a second flexible material. The padding layer panel 24 defines a first surface 26 which is for partially covering the second surface 22 which is defined by the sheet member 18. The padding layer panel 24 further defines a second surface 28 which is for interfacing with the receiving surface 14 (i.e., a ground surface, a sport field, a playground, a backyard environment, and the like). The surface covering panel 12 also includes edges 30. At least one of the edges 30 is adapted for attaching or connecting with one of the other substantially identical surface covering panels 12. It is to be noted that the top layer 17 or amusement top layer 17 and the sheet member 18 may be integral such as to form one layer of material only.

According to one embodiment, the top layer or amusement top layer 17 may include, without limitation, a rubber-like top layer (i.e., for covering playground areas), a water-resistant top layer (i.e., for swimming pool areas), a mat-like type top layer (i.e., for replacing gymnastic mat), a snow melt top layer (i.e., for driveway and around the house areas), a roof top layer, and the like According to another embodiment, there is provided a method for covering an area having boundaries with a surface covering panel assembly 10. The method includes the steps of: providing a surface covering panel assembly 10 in a rolled position; unrolling the surface covering panel assembly 10 on the area; adjusting, if necessary, the surface covering panel assembly 10 to remove gaps between the plurality of surface covering panels 12 and the boundaries; adjusting, if necessary, the surface covering panel assembly 10 to remove gaps between the surface covering panel assembly 10 and an adjacent surface covering panel assembly 10 already installed. The steps may be repeated until complete installation of the surface covering panel assembly 10 or of a plurality of surface covering panel assemblies 10.

It is also to be mentioned that each surface covering panel assembly 10 or surface covering panel 12 is to be attached to an adjacent surface covering panel assembly 10 or surface covering panel 12 with the use of one or more joining padding layer panel 32 which includes the fastening material.

Depending on the size of the artificial sports playing field (FIG. 2A) or of the size of the artificial amusement playing field (FIG. 2B) and the available equipment on site, the surface covering panel assembly 10 can be used in surface covering panels 12 or in rolls in custom lengths and widths depending of the need of the user (i.e., For example, the surface covering panel/surface covering panel assembly may be a 3'×3', 4'×6'. 10'×10', and the like).

It is to be noted that the joining padding layer panel 32 may be of the same material as the second flexible material of the padding layer panel 24 (even though the hatching styles on FIG. 4 are the same) such as to roll and unroll easily. It should also be noted that, according to an embodiment, joining padding layer panel 32 has a substantially uniform thickness. The thickness of the joining padding layer panel 32 is the same the thickness of the padding layer panel 24. Furthermore, regarding FIG. 4, it should be noted that while, as illustrated, the joining padding layer panel 32 touches the top layer 16, in most embodiments it does not.

It is further to be noted that according to an embodiment the sheet member 18 is made of a first material, namely a polymer material.

The padding layer panel 24 is made of a second material, namely a material from the list comprising an expanded polypropylene, an extruded polypropylene, a foam, an expanded polytetrafluoroethylene, an extruded polytetrafluoroethylene, an expanded polyethylene, an extruded polyethylene, an ethylene propylene diene monomer (EPDM), a crumb rubber tire, a plastic, a natural rubber, a synthetic rubber, a polyurethane, a polyvinyl chloride (PVC), a PVC mixed with an acrylonitrile-butadiene rubber (NBR), any combination and the like.

Even though some of the materials listed for the sheet member 18 and the padding layer panel 24 can be the same, it is understood that, in a single surface covering panel 12, the materials for the sheet member 18 and the padding layer panel 24 are distinct in nature thereby exhibiting different physical or structural characteristics. This could also be referred to as the materials being of different types or having different compositions. They are distinct in nature at least in that their chemical, molecular or mechanical compositions are not the same. Here are series of examples to illustrate the material distinctness: 1—both materials could be polymers, but, in a single surface covering panel 12, the materials would be different polymers; 2—both materials could be rubbers, but, in a single surface covering panel 12, the materials would be different rubbers; 3—one material could be a rubber while the other material could be an expanded polytetrafluoroethylene; 4—one material could be a continuous sheet of rubber while the other may be an assembly of crumb rubber tire; or 5—the first flexible material and the second flexible material are both materials selected from a group of polymers and further wherein the material selected for the first flexible material is not the same material as the material selected for the second flexible material. Moreover, it should be noted that, according to an embodiment, the sheet member 18, especially at the edges 30, is not an extension of the same material as that of the padding layer panel 24. It cannot be since, in this embodiment, the sheet member 18 and the padding layer panel 24 are made of different materials.

Furthermore, the flexibility of the sheet member 18 is greater than the flexibility of the padding layer panel 24. This is because each of them has a completely different function in the surface covering panel 12. As mentioned earlier, the padding layer panel 24 of the surface covering panel 12 serves as an underpad and is preferably made of a shock absorbent material. Thus, the padding layer panel 24 may be made of any suitable materials, each of the suitable materials including different shock absorbing characteristics. The main function of the sheet member 18 is to provide an interface between the top layer 16 and the padding layer panel 24. The sheet member 18 also provide the interface on which is mounted one of the two parts of the fastening material. The other part of the fastening material is mounted on either one of an edge 30 or of a joining padding layer panel 32. The greater flexibility of the sheet member 18 relative to the padding layer panel 24 hence helps in assembly/disassembly of the surface covering panels 12 with each other via the joining padding layer panel 32 or without the joining padding layer panel 32.

It also should be noted that the joining padding layer panel 32 comprises a base panel and, as indicated above, the other part of the fastening material. According to an embodiment, the base panel of the joining padding layer panel 32 is made of the same material as the padding layer panel 24 thereby providing uniform shock absorption characteristics.

According to an embodiment, the thickness of the sheet member 18 is at least 5 times less than the thickness of the padding layer panel 24. This difference in thickness contributes to the fact that the sheet member 18 is more flexible than the padding layer panel 24. According to an embodiment, the thickness of the sheet member 18 is at least 10 times less than the thickness of the padding layer panel 24.

According to embodiments, the releasable interfacing of surfaces is performed through the interfacing of mating components varying from fastening material as discussed herein before to components of complementary shapes.

According to embodiments, the use of Velcro™ material as a mating component provides freedom for small relative displacement of a surface covering panel 12 interfacing a joining padding layer panel 32 without rupture of the releasable interfacing upon undergoing an external force, with the panels 12, 32 recovering their position when released from the external force. According to an embodiment, the relative displacement is possible in both the longitudinal orientation and transversal orientation of the panels 12, 32 with abutting of a side of the joining padding layer panel 32 restraining the orientation of the small relative displacements.

According to embodiments, the surface covering panels comprise edges (see contact lines of surface covering panels on FIG. 9), with the peripheral area being located about the edges. According to embodiments, the peripheral area borders at least one of the edges, and up to all of the edges as depicted.

According to an embodiment, the width of the joining padding layer panel 32 is between about 1.25 times and 2 times the width of the peripheral area about an edge. Accordingly, the joining padding layer panel 32 allows to join two surface covering panels 12 with potential clearance between the side of the joining padding layer panel 32 and the side of a padding layer panel 24 without forcing clearance between the two surface covering panels 12 joined side by side.

Further, as depicted on FIG. 9, two surface covering panels 12 may be joined offset from each other according to their longitudinal orientation (along the longest side) or may be joined at ninety (90) degrees from each other with a longitudinal edge of a surface covering panel 12 abutting a transversal edge (the shortest edge) of another surface covering panel 12 (not depicted).

Referring now to FIGS. 3, and 5 to 8, an embodiment of the surface covering panel 12 comprises padding layer panel assemblies consisting of surface covering panels 12 having a single rigid panel 24 and joining padding layer panels 32. The surface covering panel 12 is typically mounted at the manufacturing plant with a padding layer panel 24, a first joining padding layer panel 32 attached to one of the longitudinal edges 30 adjacent the padding layer panel 24, a second joining padding layer panel 32 attached to one of the transversal edges 30 adjacent the padding layer panel 24, wherein the two joining padding layer panels 32 neighbor 50% of the periphery of the padding layer panel 24. Therefore, the second surface 22, FIG. 3, has two edges 30 extending beyond the periphery of the padding layer panel 24 free of joining padding layer panel 32, and two edges 30 having edges joining padding layer panels 32 already attached thereto. Such configuration eases the assembly of two padding layer panel assemblies. For the assembly, the second padding layer panel assembly can simply be mounted aside the padding layer panel assembly with the edge 30 free of pre-attached joining padding layer panel 32 set on a joining padding layer panel 32 of the first padding layer panel assembly.

It is worth mentioning that the assembly of the joining padding layer panels 32 to the second surface 22 involves a fastening element, preferably hoop and loop fastening means comprising a hook component and a loop component, allowing resilient movement of the joining padding layer panel 32 relative to the padding layer panel 24, aka shear movements parallel to the surface on which is mounted the panel assembly 10. Such resilient shear movement allows the panel assembly 10 to undergo extension/compression under temperature changes as resilient responses to external shear forces such as ones exerted by sport shoes thereover.

In an embodiment, the padding layer panel 24 is slightly thicker than the joining padding layer panels 32. Such difference in the thicknesses allow the second surface 22 to adopt a substantially planar shape, instead of the thickness of the joining padding layer panels 32, of the fastening material and of the clearance enclosed between the second surface 22 and the joining padding layer panel 32, resulting in the joining padding layer panels 32 bumping up the first surface 20 of the sheet member.

In a preferred embodiment, the padding layer panel 24 has a thickness of about between 10 mm and 30 mm, with a thickness difference to the thickness of the body of the second surface 22 of between 1 mm and 5 mm, and preferably between 2 mm and 3 mm.

In an embodiment, the padding layer panel 24 and the body of the joining padding layer panels 32 are made of different materials having different characteristics, and specifically difference response to compression perpendicular to the surface on which is mounted the panel assembly 10, as parallel to that surface.

The padding layer panel 24 is typically made of EPP—expanded polypropylene, or HEPP—hybrid expanded polypropylene and polyethylene. The padding layer panel 24 has a compression value of about 1.9 PCF (pound per cubic foot), with typical compression to 50% of its thickness, according to ASTM D3575 testing method, under a pressure of 33 PSI (pound per square inch). According to embodiments, range of acceptable values varies between 23 PSI (pound per square inch) and 70 PSI.

The body of the joining padding layer panels 32 is typically made of EPE—expanded polyethylene. The joining padding layer panels 32 have a compression value of about 2.8 PCF (pound per cubic foot), with typical compression to 50% of its thickness, according to ASTM D3575 testing method, under a pressure of 35 PSI. According to embodiments, range of acceptable values varies between 18 PSI (pound per square inch) and 35 PSI.

It is worth mentioning that the present description encompasses variations in the values, for instance +/−0.1 to 0.2 PCF for the density ratings, or +/−10% for other values when not specifically specified.

Such characteristics of the padding layer panel 24 and of the body of the joining padding layer panels 32, in other word the density rating of the body of the joining padding layer panels 32 being greater than of the density rating of the padding layer panel 24, provide the advantage of providing a substantially homogeneous feel to the surface of the panel assembly 10 to compression forces (when someone is stepping on the panel assembly 10 about the padding layer panel 24 versus about one joining padding layer panel 32), and a durability under shear forces and shear movement preventing premature wear of the padding layer panel 24 and of the joining padding layer panel 32.

According to an embodiment, a method of manufacture of the panel assembly 10 comprises affixing the back of e.g., the loop material, to the second surface 22 using an adhesive of the same family as the back of the loop material. According to a first example, the back of the loop material and the adhesive used to affix the loop material to the second surface 22 are polyurethan-based. According to a second example, the back of the hook material and the adhesive used to affix the hook material to the second surface 22 are acrylic-based.

According to a preferred embodiment, the loop material, aka the material forming the loops, is a hydrophobic material, e.g., polyester.

According to a preferred embodiment, the fastening component comprising the loops features a semi porous back allowing partial fusion of the back to the second surface 22, improving durability of the fixation. A preferred method of manufacture involves the application of the adhesive on at least one of the surfaces to affix, placing the loop material on the edge 30 with the underside 40 facing upward, covering the surface covering panel 12 with an air-tight material, e.g., a plastic sheet, and applying a negative pressure, aka suction, on the assembly thereby attracting the air-tight material toward the surface covering panel 12, between, e.g., 2 min and 15 min for the back of the loop material to partially fuse to the second surface 22.

According to a preferred embodiment, a similar method is applied to affix the hook component to the extension members 34. The type of adhesive is selected to be common to the back of the hook component. The material forming the hooks is preferably a hydrophobic material, e.g., polyester.

It is worth mentioning that the selection of a hydrophobic material for the material forming the hooks and the loops is the result of tests. The artificial turf may be subject to weather, e.g., rain, with the selection of the hydrophilic material, e.g., nylon, affecting the performance of the panel assembly 10.

The method of manufacture of the joining padding layer panels 32 comprises affixing the back of e.g., the loop component to the top surface, aka the surface opposed to the underside 40 of the joining padding layer panel 32.

Accordingly, an embodiment of the panel assembly 10 with at least some of the previous characteristics, namely the thickness differential, the different materials and specific characteristics thereof, the fastening element being able to resiliently undergo shear forces and movements, etc. improves the general quality and durability of the resulting panel assembly designed to be installed an artificial turf thereon.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A panel assembly for installation over a receiving surface, comprising:
    surface covering panels designed to be installed adjacent each other, each surface covering panel comprising:
        a padding layer panel made of a first material;
        a sheet member affixed to the padding layer panel, the sheet member having a first surface interfacing with the padding layer panel, edges extending beyond the padding layer panel, and a second surface opposed to the first surface; and
        a first component of a fastening element affixed to the edges; and
    joining padding layer panels, each joining padding layer panel designed to be mounted to side-by-side edges of adjacent surface covering panels, the joining padding layer panel comprising:
        a body made of a second material different to the first material, a top surface, and a bottom surface; and
        a second component of the fastening element affixed to the top surface of the joining padding layer, the first component and the second component of the fastening element adapted to interface with each other such as releasably attaching the joining padding layer panel to the edges of the adjacent surface covering panels,
    wherein the fastening element has a width designed to maintain fastening of the adjacent surface covering panels when the surface covering panels and the joining padding layer panels undergo thermal expansion resulting in shear displacement of the first component and of the second component relative to each other parallel to the sheet member,
    wherein the padding layer has a density of between 1.7 PCF and 2.1 PCF,
    where the body of the joining padding layer panel has a density of between 2.6 PCF and 3.0 PCF, and
    wherein the density of the padding layer is greater than the density of the body of the joining padding layer panel of between 0.8 PCF and 1.0 PCF.

2. The panel assembly of claim 1, wherein the first material is one of a a) EPP expanded polypropylene, and b) HEPP Hybrid expanded polypropylene and polyethylene, and the second material is EPE expanded polyethylene.

3. The panel assembly of claim 1, wherein the padding layer has a first thickness, the body of the joining padding layer panel has a second thickness, and wherein the first thickness is greater than the second thickness.

4. The panel assembly of claim 3, wherein difference between the first thickness and the second thickness is greater than 1 mm.

5. The panel assembly of claim 3, wherein difference between the first thickness and the second thickness is smaller than 5 mm.

6. The panel assembly of claim 1, wherein the padding layer consists of a single rigid component.

7. The panel assembly of claim 1, wherein the fastening element comprises a hook part and a loop part, each made of hydrophobic material.

8. The panel assembly of claim 1, wherein the first component of the fastening element comprises a back made of a material-type, wherein the back of the first component is affixed to the sheet member using an adhesive of the material-type.

9. The panel assembly of claim 8, wherein the back of the first component of the fastening element is partially fused with the sheet member using suction.

10. The panel assembly of claim 1, wherein the padding layer has a thickness, and is compressible to 50% of its thickness under a pressure of between 23 PSI and 70 PSI.

11. The panel assembly of claim 1, wherein the body of the joining padding layer panel has a thickness, and is compressible to 50% of its thickness under a pressure of between 18 PSI and 35 PSI.

12. A method of manufacturing the panel assembly of claim 1 for installation over a receiving surface, comprising:
    affixing the sheet member to the padding layer panel and having a periphery, with the sheet member extending beyond the padding layer panel into edges;
    affixing the first component of the fastening element to the edges, thereby obtaining one or the surface covering panel;
    affixing the second component of the fastening element to the top surface of the body made of the second material, thereby obtaining the joining padding layer panel; and
    attaching a number of the joining padding layer panels to the edges to neighbor 50% of the periphery of the padding layer panel, thereby obtaining a padding layer panel assembly,
    wherein two padding layer panel assemblies can be assembled into the panel assembly by laying down the first the padding layer panel assembly over the receiving surface, and laying down the second padding layer panel assembly aside the first padding layer panel assembly with one edge free of a joining padding layer panel laid over a joining padding layer panel of the first padding layer panel assembly.

13. The method of claim 12, wherein the first component has a semi porous back, wherein the step of affixing the first component of the fastening element to the edges, comprises using adhesive to affix the first component to the edge, laying down the back of the first component on the edge, placing an air-tight sheet over the surface covering panel, and applying suction to the surface covering panel thereby partially fusing the back of the first component to the sheet member.

14. The method of claim 12, wherein the first component has a back of a material-type, wherein the step of affixing the first component of the fastening element to the edges, comprises using adhesive of the material-type to affix the first component to the sheet material.

15. The method of claim 12, wherein the first material is one of a) an EPP expanded polyethylene (EPP), and b) a Hybrid expanded polypropylene and a polyethylene (HEPP), and wherein the second material is an expanded polyethylene (EPE).

* * * * *